(12) United States Patent  (10) Patent No.: US 8,194,036 B1
Braun et al.  (45) Date of Patent: Jun. 5, 2012

(54) SYSTEMS AND METHODS FOR CONTROLLING A CURSOR ON A DISPLAY USING A TRACKPAD INPUT DEVICE

(75) Inventors: Max Braun, San Francisco, CA (US); Ryan Geiss, San Jose, CA (US); Harvey Ho, Mountain View, CA (US); Thad Eugene Starner, Mountain View, CA (US); Gabriel Taubman, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/172,344

(22) Filed: Jun. 29, 2011

(51) Int. Cl.
*G06F 3/033* (2006.01)

(52) U.S. Cl. ......................................... 345/157; 345/173

(58) Field of Classification Search .......... 345/157–167, 345/173–178; 178/18.01–20.04; 715/856–862
See application file for complete search history.

(56) References Cited

U.S. PATENT DOCUMENTS

| | | | |
|---|---|---|---|
| 5,825,351 A | 10/1998 | Tam | |
| 5,856,822 A | 1/1999 | Du | |
| 6,424,338 B1 | 7/2002 | Anderson | |
| 7,339,580 B2 | 3/2008 | Westerman | |
| 7,427,979 B2 * | 9/2008 | Park et al. | 345/156 |
| 7,495,659 B2 | 2/2009 | Marriott | |
| 7,619,618 B2 | 11/2009 | Westerman | |
| 7,656,394 B2 | 2/2010 | Westerman | |
| 7,692,637 B2 | 4/2010 | Davis | |
| 7,728,823 B2 | 6/2010 | Lyon | |
| 7,737,955 B2 | 6/2010 | Hsieh | |
| 7,764,274 B2 | 7/2010 | Westerman | |
| 7,903,087 B2 | 3/2011 | Mak-Fan | |
| 7,911,456 B2 | 3/2011 | Gillespie | |
| 2003/0046401 A1 | 3/2003 | Abbott | |
| 2004/0017355 A1 | 1/2004 | Shim | |

(Continued)

FOREIGN PATENT DOCUMENTS

EP 0870223 8/2005

(Continued)

OTHER PUBLICATIONS

Forlines C, Vogel D, Kong N, Balakrishnan R, "Absotule vs. Relative Direct Pen Input," Mitsubishi Electric Research Laboratories Report, Jun. 2006, p. 1-10. Retrieved online on May 17, 2011 from http://www.merl.com/reports/docs/TR2006-066.pdf.

*Primary Examiner* — Ke Xiao
(74) *Attorney, Agent, or Firm* — McDonnell Boehnen Hulbert & Berghoff LLP

(57) ABSTRACT

Systems and methods for controlling a cursor on a display using a trackpad input device are disclosed. The systems and methods may be directed to controlling the cursor on a display separate from the trackpad input device, based on information identified about a motion of a trackpad input device or a computing device. A conversion factor may be determined to relate input to the trackpad input device with control of the cursor on the display in response to the input. The conversion factor can be adjusted when the motion information indicates that the trackpad input device or computing device is in motion. An input signal from an input to the trackpad input device may be smoothed by filtering out a mechanical vibration signal within the input signal. The input signal may also be smoothed by subtracting the absolute motion of the trackpad input device from the input signal.

20 Claims, 8 Drawing Sheets

U.S. PATENT DOCUMENTS

| | | |
|---|---|---|
| 2008/0036737 A1* | 2/2008 | Hernandez-Rebollar ..... 345/158 |
| 2009/0015559 A1 | 1/2009 | Day |
| 2009/0128489 A1* | 5/2009 | Liberty et al. ................ 345/158 |
| 2009/0174679 A1 | 7/2009 | Westerman |
| 2009/0213081 A1* | 8/2009 | Case, Jr. ....................... 345/173 |
| 2009/0251439 A1 | 10/2009 | Westerman |
| 2009/0256817 A1* | 10/2009 | Perlin et al. .................. 345/174 |
| 2010/0039394 A1 | 2/2010 | Moussavi |
| 2010/0060568 A1 | 3/2010 | Fisher |
| 2010/0097309 A1 | 4/2010 | Nishida |
| 2010/0174421 A1 | 7/2010 | Tsai |
| 2010/0194682 A1* | 8/2010 | Orr et al. ....................... 345/156 |
| 2010/0231522 A1 | 9/2010 | Li |
| 2011/0109575 A1* | 5/2011 | Lii et al. ........................ 345/173 |

FOREIGN PATENT DOCUMENTS

| | | |
|---|---|---|
| JP | 2006268665 | 5/2006 |
| KR | 20050005072 | 1/2005 |
| WO | 2009010451 | 1/2009 |
| WO | WO 2011031785 | 3/2011 |

* cited by examiner

Computer Program Product 900

Signal Bearing Medium 901

Program Instructions 902

- identifying information about a motion of the computing device, wherein the computing device includes a trackpad input device configured to control a cursor on a separate display, the display being coupled to the computing device;
- receiving an input signal from the trackpad input device indicating a motion across a sensing region of the trackpad input device;
- determining a conversion factor between the motion across the sensing region of the trackpad input device and a distance in a virtual space of the display the cursor moves in response to the input signal; and
- when the identified information indicates that the computing device is in motion, adjusting the conversion factor based on the identified information about the motion of the computing device.

| Computer Readable Medium 903 | Computer Recordable Medium 904 | Communications Medium 905 |

FIGURE 9

SYSTEMS AND METHODS FOR CONTROLLING A CURSOR ON A DISPLAY USING A TRACKPAD INPUT DEVICE

FIELD

This disclosure relates to input devices, and in examples, to trackpad input devices and functions of such devices while in motion.

BACKGROUND

Trackpad input devices use tactile sensors to map the motion and position of a user's finger or other object to a relative position on a screen. The trackpad input device was introduced as an alternative and replacement to trackballs, which rely on sensors to track the rotation of a ball within a socket, and pointing sticks, which operate by sensing applied force using a pair of resistive strain gauges. Trackpad input devices are commonly found on laptop computers but can be used as a substitute for any number of pointing input devices.

Trackpad input devices make use of capacitive sensing, conductive sensing, or other technologies to track the position of an object. A user can interact with a trackpad input device by sliding their finger along the surface of a trackpad input device to control a cursor on a display. Additionally, some trackpad input devices include the ability to interpret tapping of the trackpad input device to indicate a "click" or selection of an object on a display. Moreover, some trackpad input devices include proximity or depth sensors capable of sensing movement within a volume or sensing region.

The settings associated with a trackpad input device or the associated device driver software may allow a user to adjust the sensitivity to touch of the trackpad input device. For example, with a high trackpad input device speed setting, a one-inch slide of a finger on the trackpad input device might result in a cursor moving across the entire screen of a display, while a low trackpad input device speed setting might produce a movement across one quarter of the screen in response to the same one-inch slide. Similarly, the sensitivity to tapping may be configurable. A trackpad input device with high touch sensitivity setting might notice a light tap on the touch screen, while a trackpad input device with a low touch sensitivity setting might not be able to detect the same light tap.

SUMMARY

This disclosure may disclose, inter alia, devices and methods for controlling a cursor on a display, where the cursor is controlled using a trackpad input device separate from the display, based on an identified motion of the trackpad input device or the computing device.

In one example, a method for controlling a cursor on a display is provided. In the method, a trackpad input device is configured to control a cursor on a separate display. The display may be coupled to a computing device. The method includes but is not limited to identifying information about a motion of the trackpad input device or the computing device. Additionally, the method includes receiving an input signal from the trackpad input device indicating an input to a sensing region of the trackpad input device. The method also includes determining a conversion factor between the input received on the trackpad input device and movement of the cursor across a distance in a virtual space of the display in response to the input. Information about the identified motion of the trackpad input device or the computing device may indicate that the trackpad input device is in motion. As a result, an adjustment may be made to the conversion factor based on the identified information.

In another example, a non-transitory computer-readable medium with instructions stored thereon is provided. The instructions contain instructions executable by a computing device. The instructions contain instructions for controlling a cursor on a separate display. The display may be coupled to the computing device and a trackpad input device may be configured to control the cursor on the display. The instructions further contain instructions for identifying information about the motion of the trackpad input device or the computing device. Additionally, the instructions contain instructions for receiving an input signal from the trackpad input device indicating an input to a sensing region of the trackpad input device. According to the instructions, a conversion factor between the input received on the trackpad input device and movement of the cursor across a distance in a virtual space of the display in response to the input may be determined. The instructions also contain instructions for adjusting the conversion factor when information about the identified motion of the trackpad input device or the computing device indicates that the trackpad input device is in motion. The adjustment to the conversion factor may be made based on the identified information.

In another example, a computing device is provided. The computing device includes but is not limited to a display and a trackpad input device separate from the display. The trackpad input device may be configured to control a cursor on the display. The computing device also includes a data storage indicating instructions executable by the computing device to perform functions. The functions include identifying information about the motion of the trackpad input device or computing device. Additionally, the functions include receiving an input signal from the trackpad input device indicating an input to a sensing region of the trackpad input device. According to the functions, a conversion factor between the input received on the trackpad input device and movement of the cursor across a distance in a virtual space of the display in response to the input may be determined. The functions further include adjusting the conversion factor when information about the identified motion of the trackpad input device or computing device indicates that the trackpad input device is in motion. The adjustment to the conversion factor may be made based on the identified information.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 9 is a schematic illustrating a conceptual partial view of an example computer program product that includes a computer program for executing a computer process on a computing device, arranged according to at least some embodiments presented herein.

DETAILED DESCRIPTION

Figure 1:
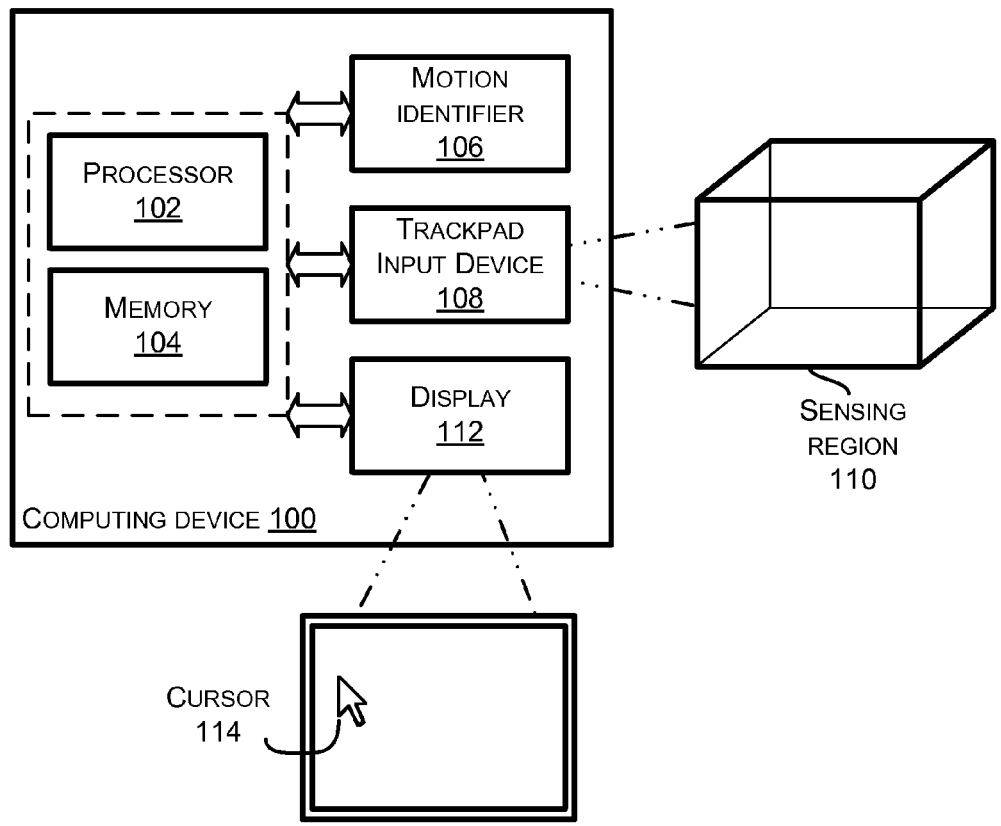
FIG. 1 illustrates an example of a computing device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, devices and methods for controlling a cursor on a display, wherein the cursor is controlled using a trackpad input device separate from the display, based on an identified motion of a trackpad input device or a computing device. The devices and methods may be directed to determining a conversion factor between an input received on the trackpad input device and movement of the cursor across a distance in a virtual space of the display in response to the input. A relationship between a direction of the movement of the cursor in response to the input may also be determined. An input to a sensing region of the trackpad input device may produce an input signal indicating the input to the computing device. In one example, information about the identified motion of the trackpad input device or computing device may indicate that the trackpad input device or computing device is in motion. As a result, an adjustment may be made to a conversion factor based on the identified information. The direction of the movement of the cursor may also be changed as a result. In another example, the adjustment may be made when a magnitude of the motion of the trackpad input device or computing device exceeds a threshold.

In one example, adjusting the conversion factor may include adjusting a sensitivity of the trackpad input device. In another example, adjusting the conversion factor may include adjusting a gain controlling movement of the cursor or adjusting an acceleration factor of the cursor.

In one example, the input to the sensing region of the trackpad input device may be a sliding motion within the sensing region. Input signals to the trackpad input device may be smoothed based on the identified information about motion of the trackpad input device. For example, mechanical vibration signals may be filtered out of the input signal to the trackpad input device.

In another example, information about a motion of the trackpad input device or computing device may be identified and used to smooth, predict, remove error from, or reconstruct an input signal received from the trackpad input device.

In other examples, inputs to the trackpad input device may be controlled in a variety of ways based on the identified information about the motion of the trackpad input device or computing device. For example, the trackpad input device may be operated in absolute or relative modes. As another example, inputs to certain regions of the trackpad input device may be controlled accordingly based on the motion of the trackpad input device or computing device. In another example, gestures inputted to the trackpad input device may indicate desired functions based on the motion of the trackpad input device or computing device.

In another example, the trackpad input device may be coupled to the computing device. In addition, the computing device may be in the form of a wearable computing device. In some examples, information may be identified about the motion of the computing device. The identified information may indicate motion of a user of the wearable computing device. Control of the cursor on the display may be adjusted based on the motion of the user of the wearable computing device.

Referring now to the figures, FIG. 1 illustrates an example of a computing device 100. The computing device 100 may include a processor 102 coupled to a memory 104. Additionally the computing device 100 may include a motion identifier 106, a trackpad input device 108, and a display 112, all of which may be coupled to the processor 102 and the memory 104.

The processor 102 may be any type of processor, such as a microprocessor, digital signal processor (DSP), multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The motion identifier 106 may be configured to identify information about motion of the trackpad input device 108. In one example, the information identified may indicate the trackpad input device 108 is in motion. In another example, the information may indicate that mechanical vibrations are impacting the trackpad input device 108. The motion identifier 106, coupled with the processor 102 and memory 104, may also be able to determine a magnitude and/or direction of the motion of the trackpad input device 108.

In one embodiment, the computing device 100 and trackpad input device 108 may move together. For example, the computing device 100 and trackpad input device 108 may both be attached to a common apparatus. As such, they may both be subject to the same motion or mechanical vibrations. The motion identifier 106 may identify information about one of or both the trackpad input device 108 and the computing device 100. In another embodiment, the computing device 100 and trackpad input device 108 may move independently. For example, the trackpad input device 108 may be separate from the computing device 100 and may relay information to the computing device 100 appropriately. In another embodiment, the motion identifier 106 may be on the computing device 100, but not on the trackpad input device 108. However, the motion identifier 106 and the computing device 100 may be otherwise rigidly connected, such that information about the motion of the trackpad input device 108 may be identified by the motion identifier 106. In examples, if the computing device 100 and trackpad input device 108 are not rigidly connected, but are connected via a hinge or other mechanism, information about the motion of the trackpad input device 108 may be identified. The computing device 100 may further be configured to make assumptions about the relative orientation between the motion identifier 106 and the trackpad input device 108. For example, the computing device 100 may include hardware sensors to detect the relative orientation of the trackpad input device 108. Given the relative orientation, the information about the motion of the trackpad input device 108 may be determined computationally. Therefore, the computing device 100 and trackpad input device 108 may experience separate or common motions or mechanical vibration and information about the motion of one of or both the computing device 100 and trackpad input device 108 may be identified by the motion identifier 106.

In one embodiment, the motion identifier 106 may include an accelerometer that is coupled to the trackpad input device 108. The accelerometer may be able to determine when the trackpad input device 108 is in motion. In one example, an accelerometer output may enable the computing device 100 to determine a magnitude and/or direction of the motion of the trackpad input device 108. Similarly, an accelerometer or other motion identifier may be coupled to the computing device 100 and enable the computing device 100 to determine a magnitude and/or direction of the motion of the computing device 100. In one embodiment, the motion identifier 106 may include a gyroscope. In another embodiment, the motion identifier 106 may include an optical flow-based motion sensor.

The motion identifier 106 may include any of a variety or combination of motion sensors for providing information about the motion of the trackpad input device 108 and/or computing device 100 as well. For example, sensor fusion may allow the combination of sensory data from an accelerometer, gyroscope, camera, magnetometer, etc., to result in a combination of information. Sensor fusion may be used in addition to using a standalone accelerometer, gyroscope, or other type of motion identifier 106. Similarly, the sensor fusion may result from fusion of sensory data from one or more identical sensors.

The computing device 100 may also include or be coupled to the trackpad input device 108. The computing device 100 may receive inputs to a sensing region 110 of the trackpad input device 108. The sensing region 110 may be a volume of space including a surface of the trackpad input device 108. However, the sensing region 110 of the trackpad input device 108 may, in one example, not include a surface, as described below when the trackpad input device 108 includes proximity sensors, cameras, etc. Inputs to the sensing region 110 may be applied to the surface of the trackpad input device 108, within the sensing region 110, or both. Although the sensing region 110 is illustrated as a cube, the sensing region 110 may be any variety or combination of two-dimensional or three-dimensional regions. The trackpad input device 108 may sense at least one of a position and a movement of a finger or other pointing device via capacitive sensing, resistance sensing, or a surface acoustic wave (SAW) process, among other possibilities. For example, the trackpad input device 108 may be capable of sensing finger movement in a direction parallel or planar to a surface of the sensing region 110, in a direction normal to the surface, or both, and may also be capable of sensing a level of pressure applied to the surface. In one example, the trackpad input device 108 may be formed of one or more translucent or transparent insulating layers and one or more translucent or transparent conducting layers. Alternatively, the trackpad input device 108 may be capable of also sensing interaction within a volume defined by the sensing region. The trackpad input device 108 may include proximity sensors, depth cameras capable of optionally tracking fingers and limbs of a user or other objects, depth sensors, theremins, magnetic sensors tracking a handheld magnetic object, among other types of sensors.

In the example of a capacitive sensing, one or more insulating layers may be coated with one or more conducting layers, and a driving signal may be applied to at least one of the one or more conducting layers. Different capacitive technologies may be used to determine the location of contact with the sensing region 110. For example, in a surface capacitance method, only one side of an insulating layer is coated with a conductive layer. A small voltage may be applied to the conductive layer, resulting in an electrostatic field. When a user's finger touches the surface, a capacitor is dynamically formed, and the trackpad input device 108 may determine the location of the touch indirectly from the change in capacitance. Alternatively, a mutual capacitance method may be used to determine touch locations at a plurality of locations (e.g., multi-touch). Capacitive sensing may also allow for proximity detection. In one example, a capacitive based sensor may enable the trackpad input device 108 to detect interaction within a volume of the sensing region 110 with or without contact with the surface of the sensing region 110. For example, the trackpad input device 108 may detect when a user's finger or other object is near a surface of the trackpad input device 108 and also identify an exact or substantially exact position within the sensing region 110. In the example of resistive sensing, contact with the surface creates a change in an electrical current between two thin, electrically conductive layers separate by a narrow gap at the point of contact. In the example of a SAW process, contact with the surface creates a change in an ultrasonic wave passing over the surface.

In one example, portions of the surface may be formed to have a raised, indented, or roughened surface, so as to provide tactile feedback to a user when the user's finger reaches the edge of the surface. In another example, the trackpad input device 108 may recognize gestures or specific finger actions within the sensing region 110.

The computing device 100 also includes a display 112 coupled to the computing device 100. For example, the display 112 may be a liquid-crystal display (LCD), a holographic display, or configured to project a display on a surface, among other types of displays. The display 112 may include any number of pixels, producing any quality of resolution. The display 112 may also be a three-dimensional display composed of voxels. The trackpad input device 108 may be used to control movement of a cursor 114 viewable on the display 112. The cursor 114 may be an indicator used to show a position on the display 112 that may respond to input from the trackpad input device 108. In one example, the cursor 114 may be in a traditional shape of an arrow pointing up and to the left. In other examples, the cursor 114 may be depicted as any number of other shapes. The cursor 114 may also change shape depending on circumstances of the computing device 100, or leave a vanishing trail on the display 112 indicating the movement of the cursor 114.

Although the trackpad input device 108 may be described with respect to controlling movement of a cursor 114, the description is not meant to be limiting. Other alternatives exist for which the methods and systems described may also apply. The trackpad input device 108 may be used to move a slider or push two-dimensional or three-dimensional objects around on the display 112. For example, a user may be able to pop bubbles or bump balloons on the display 112 with their finger using the trackpad input device 108. In other examples, the trackpad input device 108 may be used to control scrolling of a webpage or map, panning or zooming of an image or document, etc., among other possibilities.

In one embodiment, the trackpad input device 108 may be a pointing device which translates motion of a finger within the sensing region 110 of the trackpad input device 108 into motions of the cursor 114 on the display 112. The trackpad input device 108 may interpret gestures or finger actions within the sensing region 110 as special commands instead of motions intended to control the cursor 114. For example, the special commands may trigger functions that are performed in response to the gestures.

In one example, the trackpad input device 108 may be separate from the display 112. Alternatively, in an instance in which the display 112 is a touch-screen display, functions of the trackpad input device 108 may be combined into the display 112.

Figure 2:
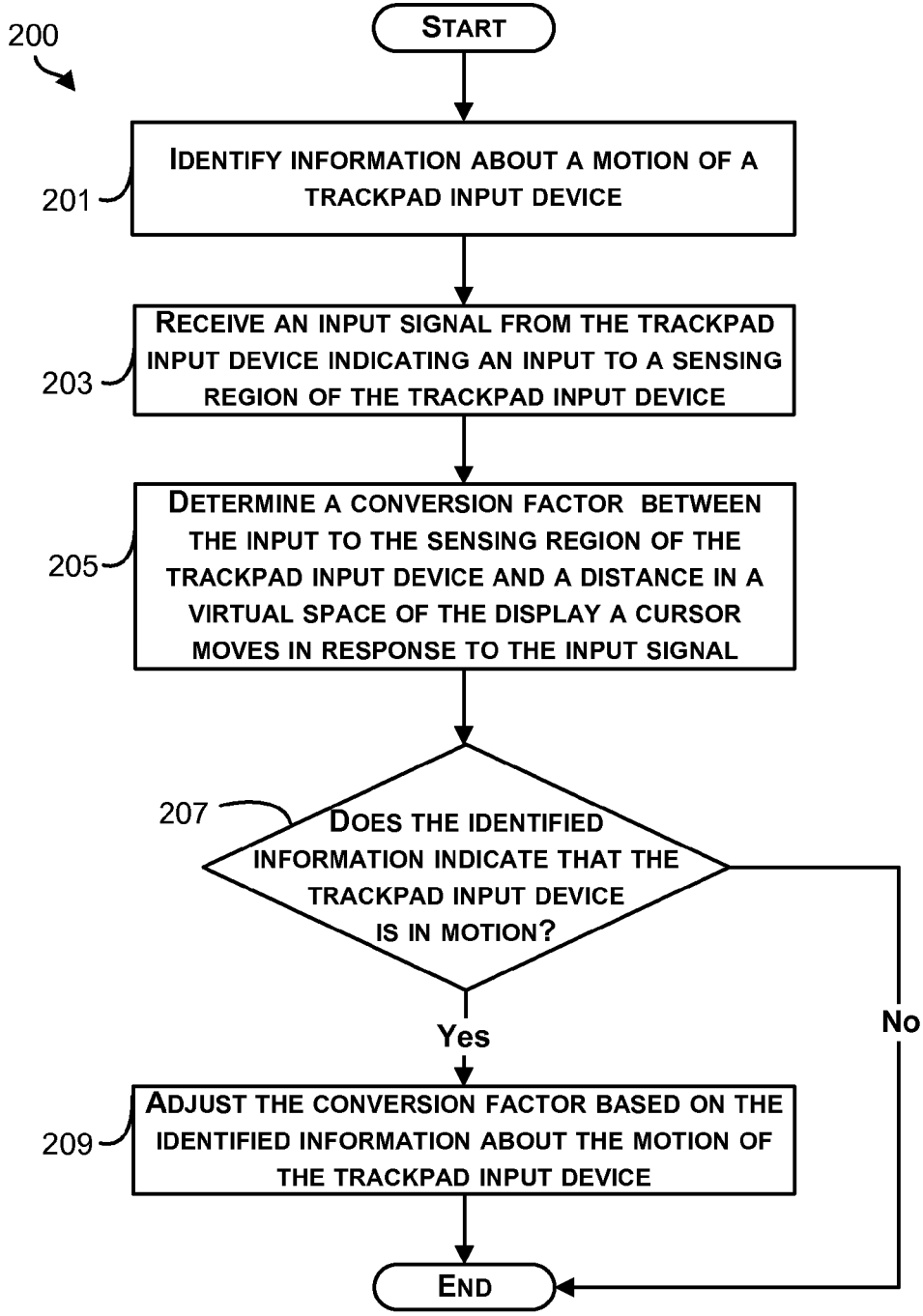
FIG. 2 is an example block diagram of a method to adjust control of inputs to a trackpad input device based on a motion of the trackpad input device or a computing device, in accordance with at least some embodiments described herein.

FIG. 2 is an example block diagram of a method 200 to adjust control of inputs to a trackpad input device based on a motion of the trackpad input device or a computing device, in accordance with at least some embodiments described herein. The method 200 shown in FIG. 2 presents an embodiment of a method that may, for example, be used by the computing device 100 of FIG. 1. Method 200 may include one or more operations, functions, or actions as illustrated by one or more of blocks 201-209. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 201, the method 200 includes identify information about a motion of a trackpad input device. In some examples, information about the motion of the trackpad input device may be an indication of whether the trackpad input device is in motion. In some examples, information about the motion of the trackpad input device may reveal an amount of mechanical vibration affecting the trackpad input device. In some examples, information about the motion of the trackpad input device may be a magnitude and/or direction of the motion of the trackpad input device or amount of vibration affecting the trackpad input device. For example, information about the motion of the trackpad input device may be identified by receiving an output from an accelerometer that is coupled to the trackpad input device. In some examples, the information about the motion of the trackpad input device may be compared with previously identified information or a statistical analysis of previously identified information to determine a relative significance. Information about motion of the computing device may also be identified, for example, in an instance in which the trackpad input device and computing device are attached to a common apparatus.

In one example, information about the motion of the trackpad input device or computing device may be identified continuously in real-time. In another example, the information about the motion of the trackpad input device or computing device may be identified on a fixed interval basis. For example, when the information about the motion of the trackpad input device indicates that the trackpad input device is in motion, the computing device may begin to continuously identify motion of the trackpad input device. In one example, the information may be stored in a memory of the computing device for a predetermined length of time.

In the embodiment where the computing device and trackpad input device move independently, information about the motion of the trackpad input device may include information about the motion of the computing device. The computing device may include a separate motion identifier.

At block 203, the method 200 includes receive an input signal from the trackpad input device indicating an input to a sensing region of the trackpad input device. The input to the trackpad input device may be an indication of a position or movement within a sensing region of the trackpad input device. For example, the sensing region may be any combination of one or both of a surface or a volume of space. In the example of a surface, the input may be a tap on one position of the surface of the trackpad input device or a sliding motion across the surface of the trackpad input device. The input may be in a direction parallel or planar to the surface, in a direction normal to the surface, or both. In one example, the input to the sensing region of the trackpad input device may indicate a position or movement of more than one input simultaneously. For example, the input to the sensing region of the trackpad input device may indicate two positions or movements based on contact of two fingers with the surface of the trackpad input device or interaction within the sensing region of the trackpad input device. In another example, the input to the sensing region may be both a contact with a surface of the sensing region and an interaction within the volume of the sensing region.

At block 205, the method 200 includes determine a conversion factor between the input to the sensing region of the trackpad input device and a distance in a virtual space of the display a cursor moves in response to the input signal. The conversion factor may be used to convert a measured quantity to a different unit of measure without changing the relative amount. In one example, the conversion factor may relate input to the trackpad input device with control of the cursor on the display in response to the input. For example, the input to the trackpad input device may be a sliding motion within a sensing region of the trackpad input device. In response to the input, the cursor may move across the display. The sliding motion within the sensing region of the trackpad input device may result in the cursor moving a distance in a virtual space across the display. For example, the distance in the virtual space may be a number of pixels. In the example, a conversion factor may relate a one inch motion across a surface of the trackpad input device with a cursor moving 500 pixels across the display. Other conversions are possible as well. As such, a conversion factor may be established between the length of the motion within the sensing region of the trackpad input device and a number of pixels on the display. However, the distance could be any distance in the virtual space of the display such as a number of voxels in the case of a three-dimensional virtual space among other types of distances.

The description of determining a conversion factor, however, is described as an example and is not intended to be limiting. A relationship between the input to the sensing region and a direction a cursor moves in response to the input signal may also be determined.

In one embodiment, the memory of the computing device may store multiple conversion factors between a length of a movement within the sensing region of the trackpad input device and a corresponding distance in the virtual space of the display. In another embodiment, the conversion factor may be used by a device driver or software driver. In one example, the device driver of the trackpad input device may utilize the conversion factor and allow the trackpad input device to communicate with an application or operating system of the computing device. The device driver may be stored in the memory of the computing device. Alternatively, the software driver of an application may utilize the conversion factor.

At block 207, the method 200 includes determining whether the identified information indicates that the trackpad input device is in motion. In one example, the decision relies on the identified information about the motion of the trackpad input device or computing device from block 201. For example, the output of the accelerometer may indicate that the trackpad input device or computing device is in motion. In another example, the output of the accelerometer may indicate that the trackpad input device or computing device is being impacted by mechanical vibrations. In other examples, outputs of other sensors including gyroscopes, optical sensors, or a camera (e.g., using computer vision) may indicate motion of the trackpad input device or computing device.

In one embodiment, the decision at block 207 may be made by determining if a magnitude of the motion of the trackpad input device or computing device is above an established threshold. For example, the accelerometer coupled to the trackpad input device may measure an amount of vibration and compare the amount with the established threshold.

In one example, it may be determined that the trackpad input device or computing device may not be in motion. As a result, the computing device may control the input to the sensing region without adjusting the conversion factor. In another example, it may be determined that the trackpad input device or computing device may be in motion. Accordingly, block 209 of the method 200 may be executed.

At block 209, the method 200 includes adjust the conversion factor based on the identified information about the motion of the trackpad input device. In one example, adjusting the conversion factor may include adjusting a sensitivity of the trackpad input device. For example, the sensitivity of the trackpad input device may be adjusted by changing a threshold for sensing contact with a surface of the trackpad input device. In one example, a magnitude of the motion of the trackpad input device or computing device may be determined. Based on the magnitude, the threshold for sensing contact may be changed relative to the magnitude of the motion of the trackpad input device or computing device. In another example, the threshold for sensing contact may be changed to a predetermined level when the identified information about the motion of the trackpad input device or computing device indicates that the trackpad input device or computing device is in motion.

In one embodiment, the threshold may be a capacitive threshold. For example, a trackpad input device may be formed by two or more electrically conductive layers. When the two conductors are placed flat against each other, a grid of electrical capacitors may be formed. In one example, a capacitance may be measured at each position of the grid. The capacitance may then be compared against the capacitive threshold to determine whether contact has been made with the surface of the trackpad input device.

In one embodiment, the sensitivity of a depth sensor may be adjusted. For example, a capacitive sensor may be used to detect interactions within a sensing region or volume. The sensor may be able to track a finger or object within the sensing region and detect hand poses (e.g., making a fist, pointing, etc.). Based on the identified information about the motion of the trackpad input device, the amount of noise in a detection of an object's position, a hand's position, fingertip's position, in the position of any joints in the hand, among other possibilities, may be reduced in accordance with an adjustment of the sensitivity.

In another embodiment, the threshold may be a pressure threshold. In the example of a grid of electrical capacitors, a total amount of capacitance may be measured. The pressure of a finger contacting the surface of the trackpad input device may be related to the total amount of capacitance. For example, as the finger pressure of a contact with the surface increases, the finger may flatten out. The resulting greater surface contact may result in a greater total capacitance. In another embodiment, the trackpad input device may sense position or movement using resistive sensing. Similarly, the pressure sensed using the resistive sensors may be compared to a pressure threshold for sensing contact with the surface of the trackpad input device.

In another embodiment, the threshold may be a duration of time during which the contact with the surface of the trackpad input device is maintained. In one example, the trackpad input device may be in motion and light "bumps" or accidental contact with the surface may occur. By changing the duration of time required for sensing contact with the surface, the trackpad input device may be able to distinguish between accidental contact and intentional contact with the surface.

In one example, adjusting the conversion factor may include adjusting a gain controlling movement of the cursor in response to the input from the trackpad input device. In one example, the conversion factor may be established between the length of a motion within the sensing region of the trackpad input device and a distance in a virtual space of the display a cursor moves on a display. For example, a one inch motion or stroke across a surface of the sensing region of the trackpad input device may move the cursor 500 pixels on the display. In one example, a gain may be applied to the conversion factor based on the motion of the computing device. For example, when the identified information about the computing device indicates that the device is in motion, the conversion factor may be reduced by a factor of 2. As such, the gain may be adjusted by a factor of one half. In another example, the gain may be determined relative to the magnitude of motion determined from the identified information.

In one example, an adjustment may be made to the direction the cursor moves in response to the input signal based on the identified information about the motion of the trackpad input device. This adjustment may be made in addition to the adjustment to the conversion factor between the input to the sensing region and the distance in the virtual space of the display the cursor moves in response. As such, the direction of motion in addition to the magnitude of the motion the cursor moves in response to the input signal may be changed as a result of many kinds of spatio-temporal filtering.

In one example, adjusting the conversion factor may include adjusting an acceleration factor of the cursor. In one example, the acceleration factor may refer to the change in speed of the cursor on a display during the motion of a finger within the sensing region of the trackpad input device. In one example, the speed of the cursor may increase after the motion across a surface of the trackpad input device has crossed a threshold. The acceleration factor may enable a quick sliding motion of a finger across the surface of the trackpad input device to allow a cursor to move a large distance across the display. In one example, the acceleration factor may be adjusted based on the motion of the trackpad input device or computing device. For example, when the computing device is in motion, the trackpad input device may lower the acceleration factor. This may allow the cursor to move slowly on the display. This may also prevent the cursor from rapidly moving around the display in response to mechanical vibrations impacting the motion across the surface of the trackpad input device. In another example, adjusting the conversion factor may include adjusting more than one acceleration factor. More than one acceleration factor may, for example, result in a nonlinear response of the cursor to sliding motions across the surface of the trackpad input device.

In one example, adjusting the conversion factor may include adjusting a point precision of the trackpad input device. In one example, when the identified information about the motion of the trackpad input device or computing device indicates that the trackpad input device or computing device is in motion, it may be desirable to decrease the point precision of the trackpad input device. In some examples, the point precision may be reduced by adjusting the acceleration factor of the cursor. In another example, the point precision may be reduced by adjusting the sensitivity or resolution of capacitive or resistive sensors used for sensing position or movement within the sensing region of the trackpad input device.

In another example, the conversion factor may be adjusted by an amount relative to a magnitude of the motion of the trackpad input device or computing device. A magnitude of the motion of the trackpad input device or computing device may be determined and compared against known magnitudes. In one example, the known magnitudes may be determined based on a past history of identified information about the motion. In another embodiment, known magnitudes may be predetermined based on the detection capabilities and limits of the motion identifier. In one example, a lookup table may be used to determine an adjustment amount which may be applied to the conversion factor based on the magnitude of motion. In another example, a formula or algorithm may be used to determine an amount of adjustment based on the magnitude of the motion.

In another example, adjusting the conversion factor may include controlling inputs to the trackpad input device in an absolute mode. For example, in the absolute mode, the trackpad input device may identify a location within the sensing region of the trackpad input device at which an input is received. In one example, in the absolute mode, the trackpad input device reports the absolute position of where a finger makes contact with the surface of the trackpad input device. The absolute position of the finger may be measured absolutely with respect to a coordinate system. In one example, the origin of a two-dimensional coordinate system (i.e., x-y axis), parallel to the surface of the trackpad input device, is located in the lower-left corner of a square surface of the trackpad input device. Therefore, the trackpad input device may report the absolute coordinates of a position to the computing device.

Similarly, in another example, the trackpad input device may also report the absolute position of input to the sensing region of the trackpad input device in a third dimension (i.e., z axis) normal to the surface of the trackpad input device. The third dimension may enable the trackpad input device to identify location within a volume of the sensing region. In one example, the absolute position in the third dimension may indicate a pressure of contact with the surface. In the example where the trackpad input device may be formed using capacitive sensors, the third dimension of the absolute position may report the total finger capacitance. The total capacitance may be affected by the contact pressure with the surface. In another example, the third dimension may indicate a depth or proximity to the surface of the sensing region using volume sensing.

In another example, controlling inputs to the trackpad input device in an absolute mode may also include reporting of a fourth value along with the absolute position. In one example, the fourth value may distinguish between a finger within the sensing region or a pointing pen or stylus within the sensing region. In another example, the fourth value may indicate the number of fingers interacting within the sensing region of the trackpad input device. In another example, the fourth value may indicate the relative size of contact with the surface of the sensing region. The fourth value may distinguish between average-sized fingers contacting the surface versus contact with the surface by a palm of a hand.

In another example, adjusting the conversion factor may include adjusting control of an input to a region within the sensing region of the trackpad input device. In one example, the trackpad input device may be operated in absolute mode. Certain regions within the sensing region of the trackpad input device may cause functions to be executed on the computing device in response to contact or interaction with the certain regions. In one example, "hotspots" or specific locations may have a predetermined function that may execute when contact is made with the locations. The "hotspots" may be used to add functionality to the trackpad input device beyond that similar to a traditional mouse. In another example, edge motion may cause a window on the display to scroll up or down. Moving a finger along the edge of the surface of the trackpad input device may result in the window on the display scrolling up.

In one example, the size of regions used for "hotspots" or edge motion may be adjusted based on the identified information about the motion of the trackpad input device or computing device. For example, the size of a hotspot may be increased when the computing device is in motion. This may make it easier for a user to make contact with the hotspot while the trackpad input device is moving around. In another example, when a magnitude of the motion of the computing device is above a threshold, inputs to certain regions within the sensing region of the trackpad input device may be disabled. For example, "hotspots" or edge motion may be disabled or locked when the trackpad input device is in motion.

In one example, adjusting the conversion factor may include controlling inputs to the trackpad input device in a relative mode. In the relative mode, movement within the sensing region of the trackpad input device may be received in relative amounts of motion in component directions with respect to a fixed coordinate system. Component directions may be established relative to a two-dimensional or three-dimensional (i.e., x-y-z axis) coordinate system parallel and/or perpendicular to the surface of the trackpad input device. In one example, relative motion is reported to the computing device. For example, a change in the position of a finger relative to the finger's previous position on the surface of the trackpad input device or depth within the sensing region may be reported to the computing device.

In another example, attenuation of cursor motion could also be a function of position. For example, a z-axis may be established normal to the surface or depth sensor of the trackpad input device, and x-y planes perpendicular to the z-axis may exist at various z-positions or distances from the surface or depth sensor. A user may indicate an input to the sensing region within a first x-y plane in proximity to the surface or depth sensor to move the cursor quickly. Alternatively, a user may move their finger farther away from the surface and indicate an input to the sensing region within a second x-y plane of the sensing region to move the cursor slowly.

In one example, based on the identified information about the motion of the trackpad input device or computing device, the trackpad input device may be operated in a relative or absolute mode. For example, when the identified information indicates that the trackpad input device is in motion, inputs to the trackpad input device may be controlled in a relative mode.

In accordance with the method 200 of FIG. 2, additional aspects of the trackpad input device may also be controlled based on the identified information about the motion of the trackpad input device or computing device. In one example, the size of a region within the sensing region of the trackpad input device in which inputs to the trackpad input device may be input may be adjusted based on the motion of the computing device. In another example, the location within the sensing region of the trackpad input device at which inputs to the trackpad input device may be input may be adjusted based on the motion of the trackpad input device.

In one example, brief contact with the surface of the trackpad input device, where a finger may touch the surface and then break contact with the surface, with little or no motion in a direction parallel to the surface of the trackpad input device may be identified as a tap. For example, the absolute position of contact may be determined with reference to a three-dimensional coordinate system. The trackpad input device may sense contact in a direction normal to the surface of the trackpad input device (i.e., z axis), at a depth greater than a threshold at one instance, but vanishing after a very short time period. During the contact, there may also be little or no motion in the directions parallel to the surface of the trackpad input device (i.e., x-y axis). In another example, the trackpad input device may identify two successive contacts with the surface of the trackpad input device. The successive taps may happen within a duration of time. In one example, this may be similar to the double-click method commonly input using a mouse.

In one example, while the identified information about the motion of the trackpad input device or computing device indicates that the trackpad input device or computing device is in motion, the duration of time in which two successive contacts with the surface can occur to provide an input may be adjusted. For example, while the computing device is determined to be in motion, the duration of time may be increased. In another example, functions on the computing device executed in response to one contact with the surface of the trackpad input device may be adjusted to be executed in response to two successive contacts with the surface. For example, when the identified information indicates that the trackpad input device is in motion, a function of selecting an icon, previously executed in response to one contact with the surface, may now be executed in response to two successive contacts with the surface of the trackpad input device. In another example, the input signal from the trackpad input device may indicate two sliding motions within the sensing region of the trackpad input device. The adjusted conversion factor may be applied to each sliding motion.

In another example, when a magnitude of the motion of the trackpad input device or computing device is above a threshold, functions that are performed in response to gestures indicated within the sensing region of the trackpad input device may be changed. Gestures recognized may be tapping gestures, sliding motion gestures, or a combination of both. In one example, a gesture may be pinching two fingers together within the sensing region of a trackpad input device. In another example, a gesture may be rotating two fingers within the sensing region of the trackpad input device, or making a spiral motion with one finger. In one example, a normal stroke indicating a linear sliding motion on the surface may control execution of one function while the computing device is stationary. When the computing device is determined to be in motion, the same stroke indicating a linear motion on the surface may cause a different function to be executed in response to the gesture. For example, the display may be locked in response to the input to the sensing region of the trackpad input device. Movement on the surface or within the sensing region of the trackpad input device may no longer cause the cursor on the display to move while the display is locked.

Figure 3:
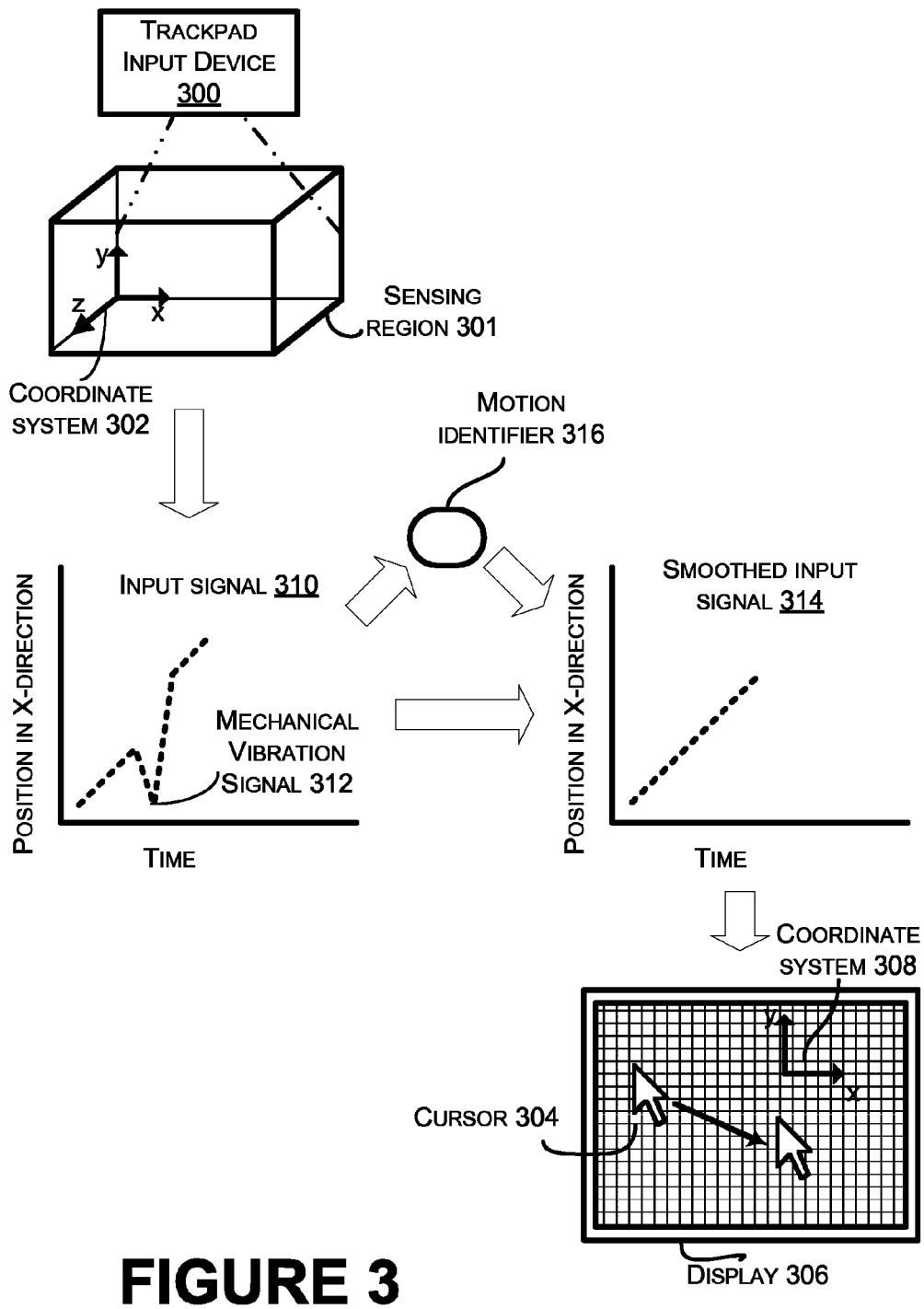
FIG. 3 illustrates an example of smoothing an input to a trackpad input device by filtering out a mechanical vibration.

Referring to FIG. 3, FIG. 3 illustrates an example of smoothing an input to a trackpad input device 300 by filtering out a mechanical vibration. In one example, a sensing region 301 of the trackpad input device 300 may receive an input while the trackpad input device 300 may be in motion or being impacted by mechanical vibrations. A movement or motion within the sensing region 301 of the trackpad input device 300 may be input with reference to a coordinate system 302. The coordinate system 302 may be two-dimensional or three-dimensional. The motion inputted within the sensing region 301 may be configured to control a cursor 304 on a display 306. The display 306 may also make use of a coordinate system 308 to map the motion on the surface 301 to motion of the cursor 304. In one example, a motion may be input within the sensing region 301, parallel to one dimension of the coordinate system 302. For example, the motion may be a linear motion in the x-direction. The motion may generate an input signal 310. For example, the input signal 310 may indicate a position in the x-direction versus time. In one example, the input signal 310 may include a mechanical vibration signal 312. The mechanical vibration signal 312 may be attributed to mechanical vibrations impacting the trackpad input device 300. Mechanical vibrations may be due to irregular movements, movement at lower frequencies, or one-time movements or impulses, among other sources of vibration. For example, mechanical vibration signals with frequencies greater than about 6 hertz may be the result of vibrations while mechanical vibration signals with frequencies below about 6 hertz may be the combination of a true signal in addition to noise. The input signal 310 may be smoothed by filtering out the mechanical vibration signal 312. For example, the input signal 310 may be smoothed to generate the smoothed input signal 314. Noise from the input signal 310 may be separated out to generate the smoothed input signal 314. The cursor 304 may then move smoothly across the display in response to the smoothed input signal 314.

In one example, a motion identifier 316 coupled to the trackpad input device 300 may be used to smooth the input signal 310. For example, an accelerometer output may be used to determine which movements on the surface 301 were intentional by the user. In one example, a low-pass filter may be applied to a Fourier transform of the accelerometer output to filter out movements above a frequency threshold. For example, any movement above a threshold of about 6 hertz may be determined to be unintentional movement. The time at which the unintentional movement occurred may be noted and the input signal 310 may then be smoothed accordingly. Thus, a mechanical vibration signal 312 with a frequency above the threshold may be ignored. In another example, the frequency threshold may be adjusted based on the identified information about the motion of the trackpad input device 300. The frequency threshold may be adjusted by an amount relative to a magnitude of the motion of the trackpad input device 300. Although the example illustrated in FIG. 3 is one-dimensional, similar techniques may be applied in higher dimensions, where use of multi-dimensional Fourier transforms may be invoked.

Figure 4:
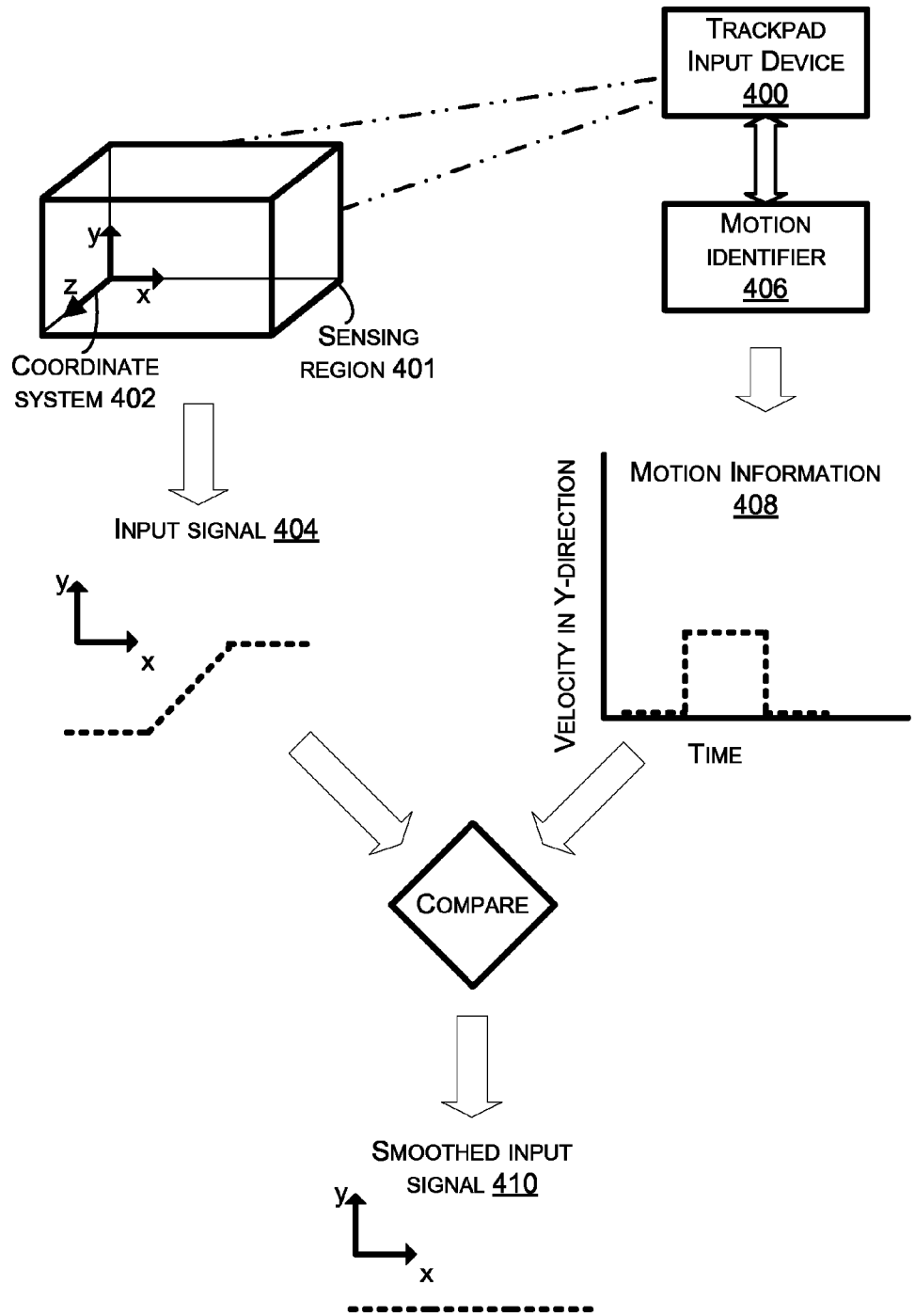
FIG. 4 illustrates an example of smoothing an input to a trackpad input device by comparing the motion of the trackpad input device with the input.

FIG. 4 illustrates an example of smoothing an input to a trackpad input device 400 by comparing the motion of the trackpad input device 400 with the input. In one example, a sensing region 401 of the trackpad input device may receive an input while the trackpad input device 400 may be in motion or being impacted by mechanical vibrations. A movement or motion within the sensing region 401 may be input with reference to a coordinate system 402. The coordinate system 402 may be two-dimensional or three-dimensional. The movement or motion within the sensing region 401 may generate an input signal 404. For example, the input signal 404 may indicate a path of the motion within the sensing region 401 with reference to the coordinate system 402. The input signal 404 may also indicate a path of a motion on a surface of the sensing region 401. A motion identifier 406 may identify information about the motion of the trackpad input device 400 while the movement or motion is input. In one example, the motion identifier 406 may generate motion information 408. For example, the motion information 408 may indicate a velocity in a y-direction relative to the coordinate system 402 versus time. A computing device may compare motion of the trackpad input device 400 with the motion within the sensing region 401 of the trackpad input device 400. In one example, the input signal 404 and motion information 408 are compared resulting in a smoothed input signal 410. The smoothed input signal may then be used by the computing device to control a cursor on a display.

In one example, the input signal 404 may be smoothed by subtracting the motion of the trackpad input device 400 from the input signal 404. The motion identifier 406 may generate motion information 408. For example, information about the absolute motion of the trackpad input device 400 may be identified by receiving an output from an accelerometer that is coupled to the trackpad input device 400. The motion information 408 may indicate that the trackpad input device 400 was moving in the y-direction for a brief moment of time while a linear motion, parallel to the x-direction, was input within the sensing region 401. A user of the trackpad input device 400 may have intended to input a linear motion parallel to the x-direction. By subtracting the motion information 408 from the input signal 404, the smoothed input signal 410 may result. The smoothed input signal 410 may indicate the linear motion, parallel to the x-direction as originally intended.

In another example, an output from an accelerometer that is coupled to the trackpad input device 400 may be received when the output from the accelerometer indicates motion. The motion of the trackpad input device 400 may be compared with the motion within the sensing region 401. A correction to the input signal 404 may be determined. For example, the motion of the trackpad input device 400 may be known based on the output from the accelerometer in a two-dimensional or three-dimensional space of motion. A finger may move within the sensing region 401 or across the surface in the same space of motion. The motion of the trackpad input device 400 may be compared with the motion input to the trackpad input device 400 to make smoother results by correcting the input signal. In one example, the motion of the finger may occur in a second space of motion. A correction to the input signal from the trackpad input device may be made by translating the motion in the second space of motion to the space of motion of the trackpad input device using, for example, a coordinate transformation matrix.

In other examples, motion information 408 may be compared with motion input to the sensing region 401 using other methods. Some methods, for example, may involve training and/or machine-learning, operate over time, and involve non-linear calculations. In one example, a user of the trackpad input device 400 may be riding on a moving vehicle (e.g., a bus) and the vehicle may hit a sudden bump. As a result, the trackpad input device 400 may likely move up suddenly, and then back down. However, often the response of the user's arm may be delayed, and perhaps the magnitude of a motion of a user's fingertip may not be as great as that of the trackpad input device 400. This may be due to the fact that the user's arm and fingertip have more shock absorption than the core body of the user, and are protected by a shoulder, elbow, and wrist joint. The methods may predict and mitigate the difference in relative motion between the trackpad input device 400 and a user's fingertip or other object.

For example, methods described herein may use information regarding a learned relationship between the effect of an impulse (i.e., bump), acceleration (e.g., elevator ride, turn in a moving vehicle, train deceleration, etc.), periodic motion (e.g., running or walking), or other motion on the trackpad input device 400 versus the effect on a user's finger. The motion information 408 of the impulse, acceleration, periodic motion, or other motion of the trackpad input device 400 may be used to smooth, predict, or reduce error from the finger position data of the input signal 404 according to the relationship. Undesired external signals due to the bump may be removed from the input signal 404 to leave desired signals or intended motion of the user's finger. In one example, this may be accomplished by detecting a current scenario (e.g., walking, running, riding a bus, etc.) and applying an appropriate algorithm for the scenario. Alternatively, generic algorithms may be trained to process input to the trackpad input device 400 for many scenarios. Algorithms may be developed through machine-learning or other training-based systems based on training data of various motion patterns, cases, or scenarios. Furthermore, algorithms, or data pertaining to the algorithms, may be stored in a database and accessed during execution of example methods to determine appropriate modifications to the signals.

In another example, a motion in a direction normal to a surface of the trackpad input device 400 may be used to control detection of a tap to the surface. The motion identifier 406 may determine that a motion has occurred in a direction normal to the surface of the trackpad input device 400. A tap to the surface of the trackpad input device 400 may have also occurred at the same time as the motion. In the case where the direction of the motion to the trackpad input device 400 causes the surface to move closer to a user's finger or other object used for contacting the surface, the tap to the surface may be demoted to a non-tap. As a result, trackpad input device 400 may ignore and not indicate the tap to a computing device as a result of the motion normal to the surface. Similarly, a proximity sensor may be used to sense a near-tap within the sensing region 401. A finger or other object may have nearly contacted the surface of the trackpad input device 400 at the time of the motion normal to the surface. However, the finger or object may not have actually contacted the surface (or may not have contacted the surface using enough force to cause an input to be received) because the motion may have moved the surface away from the finger or object. As a result, the trackpad input device 400 may promote the near-tap to an actual tap and indicate the tap to the computing device.

In another example, a user may be operating a touch-sensitive wrist watch, a touch-sensitive mobile phone, or other computing device on a bus, car, train, or other moving vehicle. The vehicle may hit a bump, and the user may happen to tap at the exact same time. As a result, the tap may be filtered out.

Figure 5:
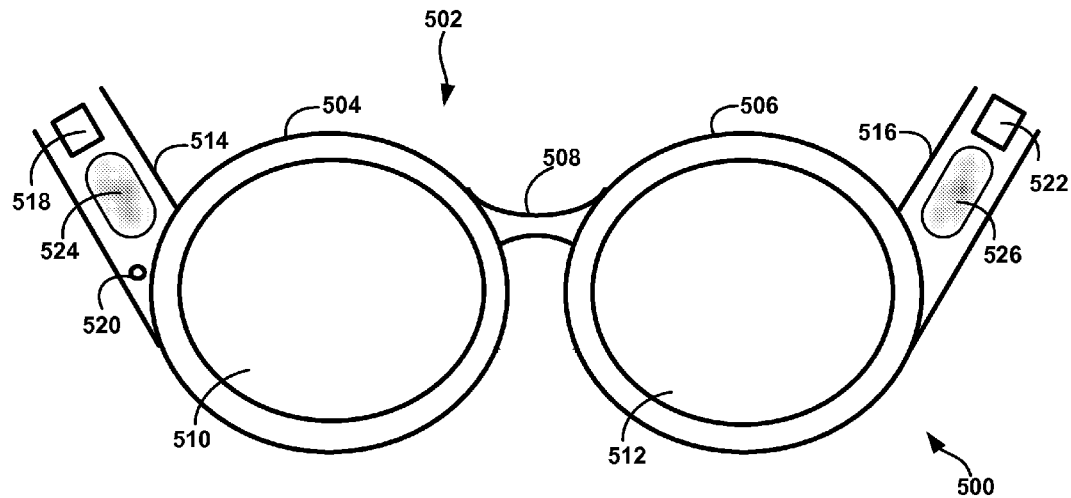
FIG. 5 illustrates an example system.

In one embodiment, a computing device for controlling a cursor on a display may be a wearable computing device. FIG. 5 illustrates an example system 500. The system 500 is shown in the form of a wearable computing device. While FIG. 5 illustrates eyeglasses 502 as an example of a wearable computing device, other types of wearable computing devices could additionally or alternatively be used. As illustrated in FIG. 5, the eyeglasses 502 comprise frame elements including lens-frames 504 and 506 and a center frame support 508, lens elements 510 and 512, and extending side-arms 514 and 516. The center frame support 508 and the extending side-arms 514 and 516 are configured to secure the eyeglasses 502 to a user's face via a user's nose and ears, respectively. Each of the frame elements 504, 506, and 508 and the extending side-arms 514 and 516 may be formed of a solid structure of plastic or metal, or may be formed of a hollow structure of similar material so as to allow wiring and component interconnects to be internally routed through the eyeglasses 502. Each of the lens elements 510 and 512 may be formed of a material configured to display a projected image or graphic. Each of the lens elements 510 and 512 may also be sufficiently transparent to allow a user to see through the lens element. In one example, combining these two features of the lens elements 510 and 512 can facilitate an augmented reality or heads-up display where a projected image or graphic may be superimposed over a real-world view as perceived by the user through the lens elements 510 and 512.

The extending side-arms 514 and 516 are each projections that extend away from the frame elements 504 and 506, respectively, and are positioned behind a user's ears to secure the eyeglasses 502 to the user. The extending side-arms 514 and 516 may further secure the eyeglasses 502 to the user by extending around a rear portion of the user's head. Additionally or alternatively, for example, the system 500 may connect to or be affixed within a head-mounted helmet structure. Other possibilities exist as well.

The system 500 may also include an on-board computing system 518, a video camera 520, a sensor 522, and finger-operable trackpad input devices 524, 526. The on-board computing system 518 is shown to be positioned on the extending side-arm 514 of the eyeglasses 502; however, the on-board computing system 518 may be provided on other parts of the eyeglasses 502. The on-board computing system 518 may include a processor and memory, for example. The on-board computing system 518 may be configured to receive and analyze data from the video camera 520 and the finger-operable trackpad input devices 524, 526 (and possibly from other sensory devices, user interfaces, or both) and generate images for output to the lens elements 510 and 512.

The video camera 520 is shown to be positioned on the extending side-arm 514 of the eyeglasses 502; however, the video camera 520 may be provided on other parts of the eyeglasses 502. The video camera 520 may be configured to capture images at various resolutions or at different frame rates. Many video cameras with a small form-factor, such as those used in cell phones or webcams, for example, may be incorporated into an example of the system 500. Although FIG. 5 illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown mounted on the extending side-arm 516 of the eyeglasses 502; however, the sensor 522 may be provided on other parts of the eyeglasses 502. The sensor 522 may include one or more of a gyroscope or an accelerometer, for example. Other sensing devices may be included within the sensor 522 or other sensing functions may be performed by the sensor 522.

The finger-operable trackpad input devices 524, 526 are shown mounted on the extending side-arms 514, 516 of the eyeglasses 502. Each of finger-operable trackpad input devices 524, 526 may be used by a user to input commands. The finger-operable trackpad input devices 524, 526 may sense at least one of a position and a movement of a finger via capacitive sensing, resistance sensing, or a surface acoustic wave process, among other possibilities. The finger-operable trackpad input devices 524, 526 may be capable of sensing finger movement in a direction parallel or planar to the pad surface, in a direction normal to the pad surface, or both, and may also be capable of sensing a level of pressure applied. The finger-operable trackpad input devices 524, 526 may be capable of sensing finger movement or movement of an object with or without contact to the trackpad input devices 524,526. For example, the trackpad input devices 524,526 may be capable of proximity detection. The finger-operable trackpad input devices 524, 526 may be formed of one or more translucent or transparent insulating layers and one or more translucent or transparent conducting layers. Edges of the finger-operable trackpad input devices 524, 526 may be formed to have a raised, indented, or roughened surface, so as to provide tactile feedback to a user when the user's finger reaches the edge of the finger-operable trackpad input devices 524, 526. Each of the finger-operable trackpad input devices 524, 526 may be operated independently, and may provide a different function. The finger-operable trackpad input devices 524, 526 may control a cursor on a display on the lens elements 510, 512.

Figure 6:
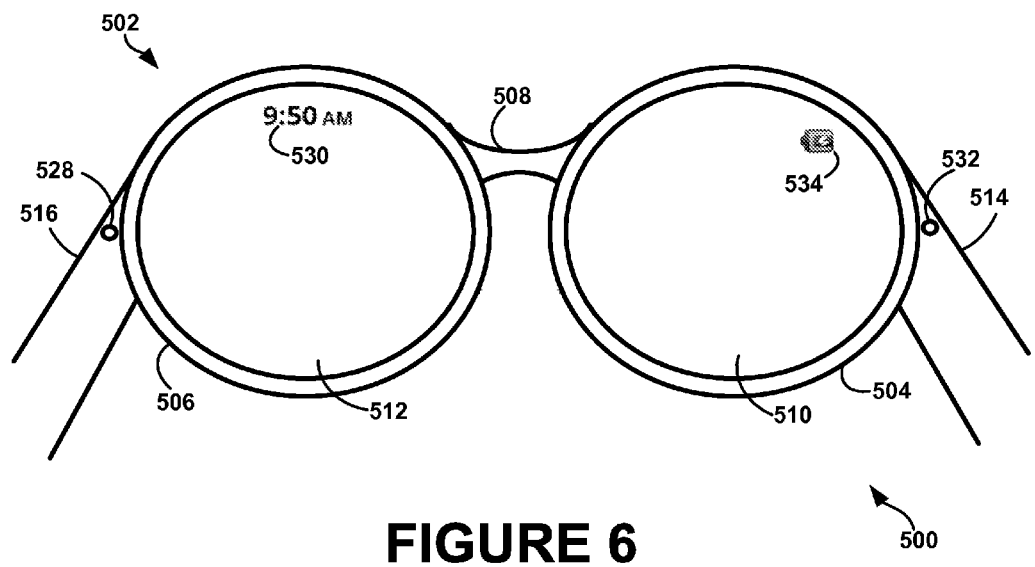
FIG. 6 illustrates an alternate view of the system of FIG. 5.

FIG. 6 illustrates an alternate view of the system 500 of FIG. 5. As shown in FIG. 6, the lens elements 510 and 512 may act as display elements. The eyeglasses 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and may be configured to project a display 534 onto an inside surface of the lens element 510.

The lens elements 510 and 512 may act as a combiner in a light projection system and may include a coating that reflects the light projected onto the lens elements 510 and 512 from the projectors 528 and 532. In some embodiments, a special coating may not be used (e.g., when the projectors 528 and 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504 and 506 for driving such a matrix display. Alternatively or additionally, a laser or LED source and scanning system could be used to draw a raster display directly onto the retina of one or more of the user's eyes. Other possibilities exist as well.

In one example, information about motion of the computing device may include information indicating motion of a user of the wearable computing device such as the system 500. The motion of the user of a wearable computing device may indicate that the user is walking. For example, an accelerometer may be configured to provide an output indicating the motion of the user of the wearable computing device. The output from the accelerometer may indicate a periodic pattern of motion suggesting that the user is walking.

In one example, when the information about the motion of the user of the wearable computing indicates the user is walking, an adjustment to a conversion factor may be made. The conversion factor may relate motion within a sensing region of a trackpad input device to a distance or direction in a virtual space of the display a cursor moves in response to the input signal. The conversion factor may be adjusted based on the identified information about the motion of the user of the wearable computing device. In another example, adjustments are made to the conversion factor when the identified information about the motion of the user of the wearable computing device indicates the user is walking. In another example, while a magnitude of motion of the computing device is above a threshold, a position of a cursor on display may be locked. For example, while the user is walking, the magnitude of motion may be above a threshold and the cursor may remain in a constant position on the display. The cursor may be unlocked when the magnitude of motion is reduced or the user stops walking or slows a speed of movement.

In one example, a user of the wearable computing device walking down the street may lead to mechanical vibrations. In another example, a user of the wearable computing device riding a bus may lead to mechanical vibrations. An input signal to a trackpad input device may be smoothed by filtering out a mechanical vibration signal within the input signal.

In another example, the trackpad input device may be operated in a relative mode when the user of the wearable computing device is walking. In another example, the sensitivity of the trackpad input device may be adjusted to increase the threshold for sensing contact with a surface of the trackpad input device. This may, for example, prevent accidental taps from being treated as inputs to the computing device while the user is walking.

In one example, information about the motion of a user of the wearable computing device may include information about the three-dimensional motion of the user. The motion information may be used to smooth, predict, remove error from, or reconstruct the motion of the user's arm when inputting motion via the trackpad input device.

Further, although some methods and systems disclosed are described with reference to a trackpad input device controlling movements of a cursor on a separate display, the systems and methods can also be applied to other devices including a touch-sensitive wristwatch, a touch screen cell phone, or tablet computer, among other types of devices. For example, a user of a device may be riding a moving vehicle while attempting to provide an input. The systems and methods may be applied to control inputs to or smooth, predict, remove error from, or reconstruct an input signal received by the device. A different set of training data may be used to develop algorithms through machine-learning or other training-based systems for the devices.

Additionally, any of the examples for adjusting the conversation factor or additional aspects controlling the trackpad input device may be applied, as described previously, based on the identified information about the motion of the user of the wearable computing device. The examples described, however are not intended to be limiting, and any of a variety or combination of other techniques may also be applied.

Figure 7:
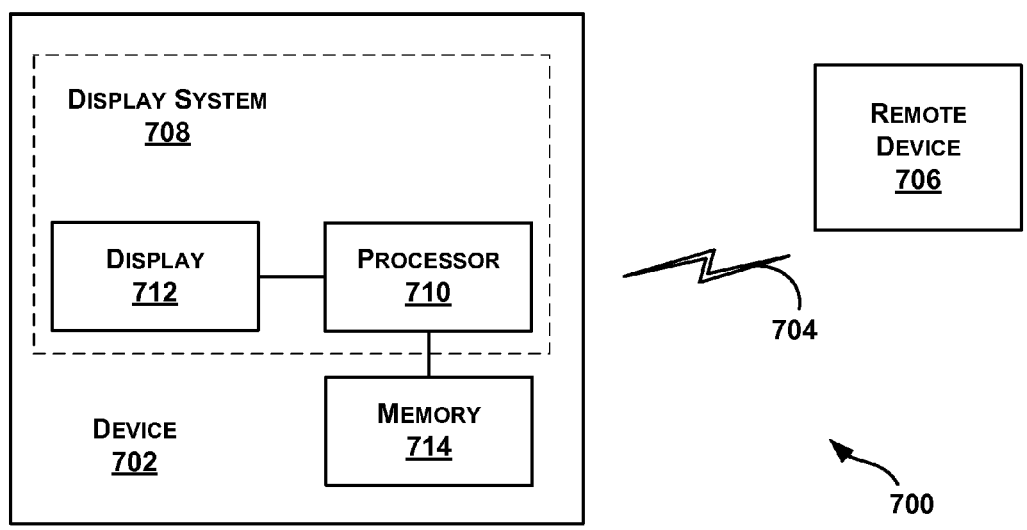
FIG. 7 illustrates an example schematic figure of a computer network infrastructure in which a wearable computing device may operate.

Referring now to FIG. 7, an example schematic figure of a computer network infrastructure 700 is illustrated, in which a wearable computing device may operate. The computer network infrastructure 700 includes a device 702 configured to communicate using a communication link 704 (e.g., a wired or wireless connection) to a remote device 706. The device 702 may be any type of device that can receive data and display information corresponding to or associated with the data. For example, the device 702 may be a heads-up display system, such as the eyeglasses 502 described with reference to FIGS. 5 and 6.

Thus, the device 702 may include a display system 708 comprising a processor 710 and a display 712. The display 712 may be, for example, an optical see-through display, an optical see-around display, or a video see-through display. The processor 710 may receive data from the remote device 706, and configure the data for display on the display 712. The processor 710 may be any type of processor, such as a microprocessor or a digital signal processor, for example.

The device 702 may further include on-board data storage, such as memory 714, coupled to the processor 710. The memory 714 may store software that can be accessed and executed by the processor 710, for example.

The remote device 706 may be any type of computing device or transmitter including a laptop computer, a mobile telephone, etc., that is configured to transmit data to the device 702. The remote device 706 and the device 702 may contain hardware to enable the communication link 704, such as processors, transmitters, receivers, antennas, etc.

In FIG. 7, the communication link 704 is illustrated as a wireless connection. The wireless connection may include using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Wired connections may also be used. For example, the communication link 704 may be a wired link via a serial bus such as a universal serial bus or a parallel bus. A wired connection may be a proprietary connection as well. The remote device 706 may be accessible, using wired or wireless links, via the Internet and may comprise a computing cluster associated with a particular web service (e.g., social-networking, photo sharing, address book, etc.).

Figure 8:
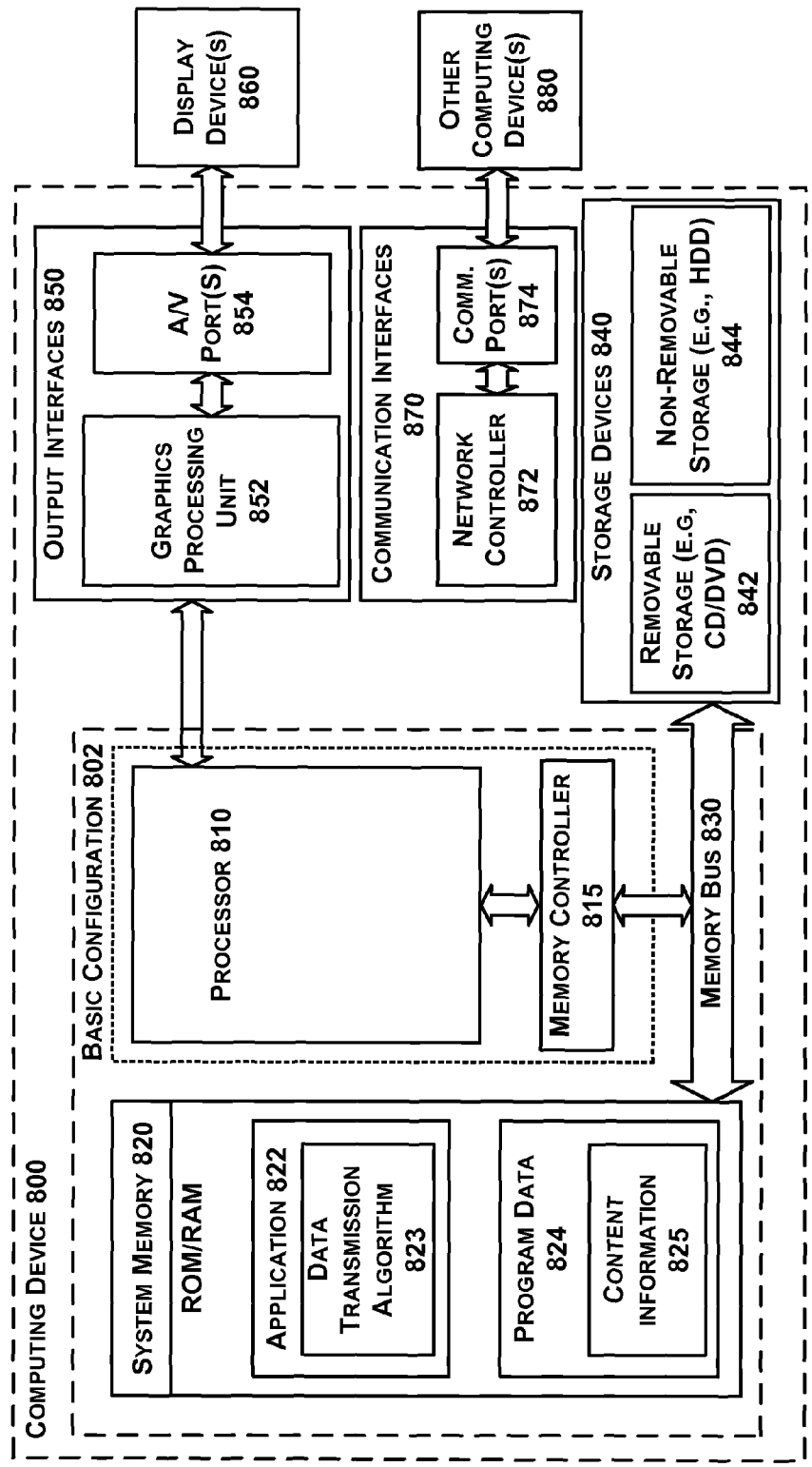
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device may be a personal computer, mobile device, cellular phone, touch-sensitive wristwatch, tablet computer, video game system, or global positioning system, and may be implemented as a wearable computing device, a display device, a transmitter, a host, or a portion of a display device, transmitter, or host as described in FIGS. 1-7. In a very basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (μP), a microcontroller (μC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include an image display algorithm 823 that is arranged to provide inputs to the electronic circuits, in accordance with the present disclosure. Program data 824 may include content information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein. In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. Thus, for example, referring to the embodiments shown in FIG. 2, one or more features of blocks 201-209 may be undertaken by one or more instructions associated with the signal bearing medium 901.

In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    identifying information about a motion of a trackpad input device configured to control a cursor on a separate display, the display being coupled to a computing device;
    receiving an input signal from the trackpad input device indicating an input to a sensing region of the trackpad input device, the input to the sensing region of the trackpad input device including a sliding motion within the sensing region of the trackpad input device;
    determining a nonzero conversion factor between the input to the sensing region of the trackpad input device and a distance in a virtual space of the display the cursor moves in response to the input signal; and
    when the identified information indicates that the trackpad input device is in motion, adjusting the nonzero conversion factor based on the identified information about the motion of the trackpad input device.

2. The method of claim 1, wherein adjusting the nonzero conversion factor comprises changing a threshold for sensing contact with a surface on the trackpad input device.

3. The method of claim 2, further comprising:
    determining a magnitude of the motion of the trackpad input device; and
    based on the magnitude of the motion, changing the threshold for sensing contact with the surface on the trackpad input device relative to the magnitude of the motion of the trackpad input device.

4. The method of claim 1, wherein adjusting the nonzero conversion factor comprises adjusting a gain controlling movement of the cursor in response to the input signal.

5. The method of claim 1, wherein adjusting the nonzero conversion factor comprises adjusting an acceleration factor of the cursor.

6. The method of claim 1, further comprising:
    smoothing the input signal by filtering out a mechanical vibration signal within the input signal, wherein the mechanical vibration signal has a frequency above a frequency threshold.

7. The method of claim 1, further comprising:
    smoothing the input signal by subtracting the motion of the trackpad input device from the input signal.

8. The method of claim 7, wherein identifying information about the motion of the trackpad input device comprises receiving an output from an accelerometer that is coupled to the trackpad input device.

9. The method of claim 1, further comprising:
    receiving an output from an accelerometer that is coupled to the trackpad input device; and
    when the output from the accelerometer indicates motion of the trackpad input device:
        comparing the motion of the trackpad input device with the input to the sensing region of the trackpad input device; and
        determining a correction to the input signal from the trackpad input device.

10. The method of claim 9, wherein the output from the accelerometer indicates motion of the trackpad input device normal to a surface of the trackpad input device during the input to the sensing region, wherein the input to the sensing region comprises a tap to the surface, the method further comprising, based on a direction of the motion normal to the surface, demoting the tap to a non-tap by removing information indicating the tap from the input signal.

11. The method of claim 9, wherein the output from the accelerometer indicates motion of the trackpad input device normal to a surface of the trackpad input device during the input to the sensing region, wherein the input to the sensing region comprises a near-tap to the surface, the method further comprising, based on a direction of the motion normal to the surface, promoting the near-tap to a tap by adding information indicating the tap to the input signal.

12. The method of claim 1, wherein adjusting the nonzero conversion factor comprises controlling inputs to the trackpad input device in a relative mode, wherein a movement within the sensing region of the trackpad input device is received in relative amounts of motion in component directions with respect to a fixed coordinate system of the trackpad input device.

13. The method of claim 1, further comprising:
    when a magnitude of the motion of the trackpad input device is above a threshold;
    changing functions that are performed in response to the input signal from the trackpad input device indicating the input to the sensing region of the trackpad input device.

14. A non-transitory computer readable medium having stored therein instructions executable by a computing device to cause the computing device to perform functions of:
    identifying information about a motion of a trackpad input device, wherein the trackpad input device is configured to control a cursor on a separate display, the display being coupled to the computing device;
    receiving an input signal from the trackpad input device indicating an input to a sensing region of the trackpad input device, the input to the sensing region of the trackpad input device including a sliding motion within the sensing region of the trackpad input device;
    determining a nonzero conversion factor between the input to the sensing region of the trackpad input device and a distance in a virtual space of the display the cursor moves in response to the input signal; and
    when the identified information indicates that the trackpad input device is in motion, adjusting the nonzero conversion factor based on the identified information about the motion of the trackpad input device.

15. A computing device comprising:
    a display;
    a trackpad input device separate from the display, the trackpad input device configured to control a cursor on the display;
    a data storage indicating instructions executable by the computing device to perform functions of:
        identifying information about a motion of the trackpad input device;
        receiving an input signal from the trackpad input device indicating an input to a sensing region of the trackpad input device, the input to the sensing region of the trackpad input device including a sliding motion within the sensing region of the trackpad input device;
        determining a nonzero conversion factor between the input to the sensing region of the trackpad input device and a distance in a virtual space of the display the cursor moves in response to the input signal; and when the identified information indicates that the trackpad input device is in motion, adjusting the nonzero conversion factor based on the identified information about the motion of the trackpad input device.

16. The computing device of claim 15, wherein the trackpad input device is coupled to the computing device, the method further comprising identifying information about the motion of the computing device.

17. The computing device of claim 15, wherein the computing device comprises a wearable computing device.

18. The computing device of claim 17, further comprising an accelerometer configured to provide an output indicating the motion of the user of the wearable computing device.

19. The computing device of claim 15, wherein the input to the sensing region of the trackpad input device is a sliding motion across a surface of the trackpad input device.

20. The computing device of claim 15, further comprising:

determining a relationship between the input to the sensing region and a direction a cursor moves in response to the input signal; and adjusting the direction the cursor moves based on the identified information about the motion of the trackpad input device.

* * * * *